Sept. 14, 1954     A. J. CULP     2,688,957
AIR INLET VALVE
Filed June 3, 1952
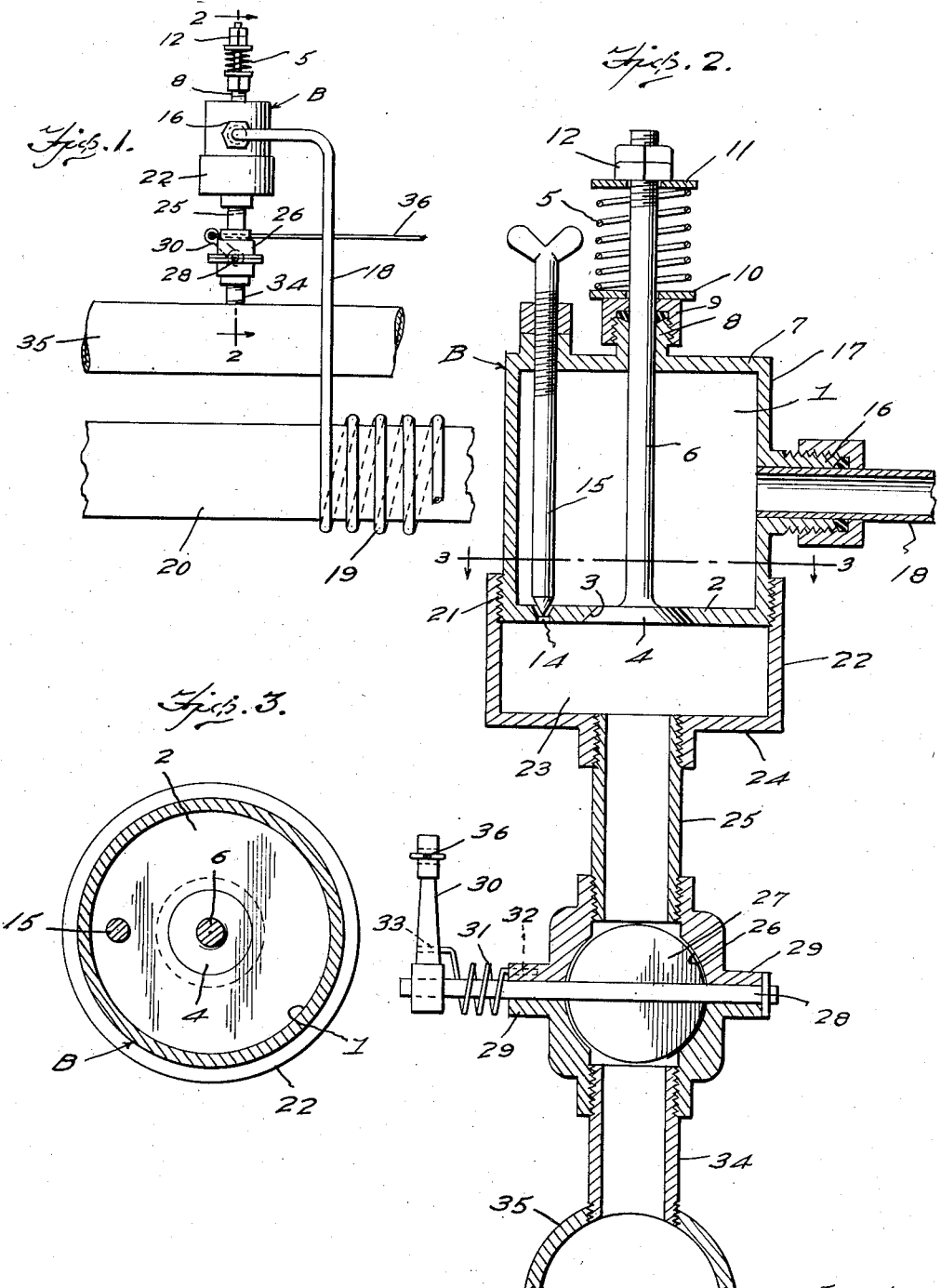
Inventor
Arthur J. Culp
By Wilfred E. Lawson
ATTY Patented Sept. 14, 1954

2,688,957

UNITED STATES PATENT OFFICE 2,688,957

AIR INLET VALVE

Arthur J. Culp, Clanton, Ala.

Application June 3, 1952, Serial No. 291,385

1 Claim. (Cl. 123—124)

This invention relates to an air inlet valve and has relation more particularly to a valve of this kind of a spring controlled type and which is especially designed for use in connection with the intake manifold of an internal combustion engine.

It is an object of the invention to provide a valve of this kind which operates in a manner to allow air to enter the cylinders of a motor without passing through the carburetor and thus eliminating the drawing in of adulterated air and/or foreign matter through the exhaust pipe when the throttle valve is closed.

The invention consists in the details of construction and in the combination and arrangement of the several parts of my improved air inlet valve, whereby certain advantages are attained, as will be hereinafter more fully set forth.

In order that my invention may be better understood, I will now proceed to describe the same with reference to the accompanying drawings, wherein:

Figure 1 is a fragmentary view in elevation illustrating in applied position an air inlet valve constructed in accordance with an embodiment of the invention;

Figure 2 is an enlarged sectional view taken substantially on the line 2—2 of Figure 1 with parts in elevation;

Figure 3 is a sectional view taken substantially on the line 3—3 of Figure 2.

As illustrated in the accompanying drawings, B denotes a hollow cylindrical member providing an internal chamber 1 of desired dimension and which is provided in the central portion of its bottom wall 2 with an opening 3 defined by outwardly or downwardly facing valve seat 3 with which coacts from below with a valve member 4. This valve member 4 is constantly urged towards its seat by an expansible spring 5 of required tension. This spring 5 in the present embodiment of the invention is of a coil type and surrounds the upper portion of the valve stem 6. The stem 6 is slidably disposed through the top wall 7 of the member B through the gland 8. Associated with the gland 8 is the usual type of nut 9 against which bears the spring 5. The lower end of the spring 5 has direct contact with a washer 10 freely mounted on the stem 6 and engaging the gland nut 9. The opposite end of the spring 5 bears from below against a second washer 11 freely mounted on the stem 6 and abutting a nut 12 threading on the upper or outer extremity of the stem 6. The tension of the spring 5 may be regulated within certain limitations by a required adjustment of the nut 12 along the stem 6.

The one side of the valve seat 3, the bottom wall 2 of the member B is provided with a restricted escape port 14 under control from above of a needle valve 15 threading through the top wall 7 of the member B.

In communication, as at 16, with the chamber 1 through which a side wall 17 of the member B is an air inlet tube 18, preferably of copper. This tube 18, as shown at 19 in Figure 1, encircles the exhaust pipe 20 of the motor or an equivalent element to heat the air before entering the chamber 1.

Detachably engaged from below, by threading as at 21 or otherwise as desired, is the open face portion of a cup like member or cap 22 providing a supplemental chamber 23 with which the chamber 1 communicates through the opening 3.

In communication with the chamber 23 through the closed head or bottom wall 24 of the member or cap 22 at substantially the axial center thereof is a nipple 25 of desired dimensions and which leads to and is in communication with a valve casing 26 in which operates a disk valve member 27. This valve member 27 is carried by a stem 28 disposed radially thereacross with the opposite end portions of the stem rotatably supported, as at 29, with opposed portions of the casing.

One end portion of the shaft 28 extends outwardly beyond the casing 26 and fixed to said extended portion of the shaft 28 is an operating arm 30. The valve member 27 is normally maintained in open position by a spring element 31 of required tension and herein disclosed as encircling the extended portion of the shaft 28 and having one extremity anchored, as at 32, to the casing 26 and its opposite extremity operatively engaged, as at 33, to the arm 30.

Leading from the valve casing 26 is a nipple 34 which threads through the wall of the intake manifold 35 and discharges within such manifold.

The arm 30 may be operated in any manner desired to adjust the valve 27 from open to closed position but I have found desirable to attach to said arm 30 an extremity of a pull wire 36 which extends to the usual instrument board.

During the normal operation of the motor, the valve member 4 is maintained closed by the spring 5. However, when the motor creates a suction, as when running a high speed or the vehicle coasting with the throttle of the motor closed, the valve 4 will move into open position and air will be drawn into the manifold 35 through the tube or line 18 and the valve unit.

Although not shown in the drawings, it is to be stated that a suitable filtering device may be applied to the out or induction end of the tube or line 18 to prevent dust or other foreign matter from passing to the motor through said tube or line 18.

By the use of the valve as herein embodied, the motor may be supplied when required with substantial quantities of pre-heated air so that the fuel will be freely vaporized and rendered more combustible for the motor and more shrinkable for the muffler in order to create a strong vacuum in the muffler to make a forward pull on the pistons of the motor when the exhaust valves are opened for discharge.

From the foregoing description it is thought to be obvious that an air inlet valve constructed in accordance with my invention is particularly well adapted for use by reason of the convenience and facility with which it may be assembled and operated.

I claim:

In an air intake valve for internal combustion engines, including the intake manifold and the exhaust pipe of the engine, a hollow body having flat top and bottom walls, a second hollow body having an open top and a flat bottom wall, the lower end of the first body being threaded inwardly of the open top of said second body and having a valve seat formed in the center of its bottom wall to establish communication between the two bodies, a downwardly opening valve element normally closed on said seat, a packing gland formed on the top wall of the first body and opening therethrough in line with said seat, a stem rising from said valve element through said seat and the gland, a coil spring encircling said stem above the gland, a washer on said stem and seated on said gland beneath the spring, a second washer on said stem and seated on the upper end of the spring, a nut threaded on the upper end of said stem and bearing against said second washer to affect adjustment of the tension of the spring, a lock nut threaded on said stem for cooperation with the first nut, a bleeder valve seat formed in the bottom wall of the first body at one side of the first valve seat, a needle valve cooperative with the bleeder valve seat and having its stem rising through the first body and through the top wall of the latter, an air intake tube having one end opening through the side wall of the first body and its other end to atmosphere, a portion of the latter end of said tube being coiled about the exhaust pipe, said second body having an outwardly nippled opening formed at the center of its bottom wall, a throttle valve coupled between said nippled opening and an opening in said intake manifold, and a remote control means extending from said throttle valve for affecting its actuation as required.

References Cited in the file of this patent

UNITED STATES PATENTS

| Number | Name | Date |
|---|---|---|
| 1,375,610 | Schmidt | Apr. 19, 1921 |
| 2,311,351 | Schmelz | Feb. 16, 1943 |